O. Sampson,
Wheel Plow.
No. 112,079. Patented Feb. 21, 1871.
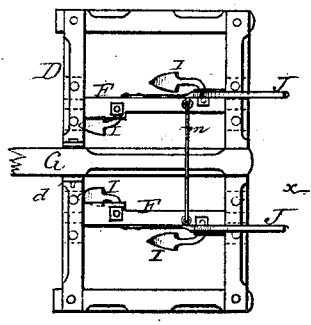
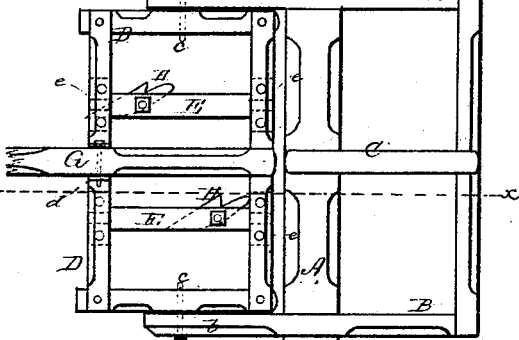
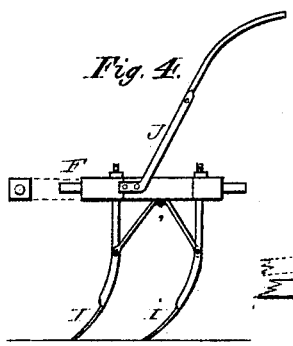
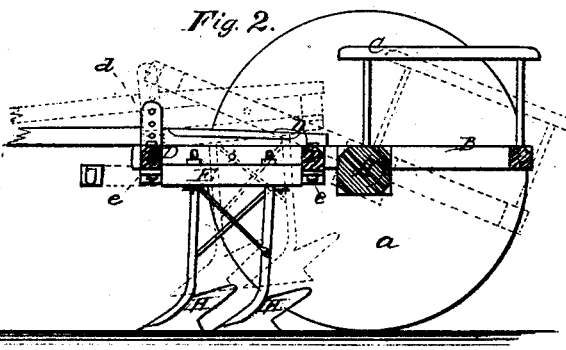
Witnesses:
Phil. T. Dodge
Thomas Taylor
Inventor:
O. Sampson
by Dodge & Munn
his Atty.

UNITED STATES PATENT OFFICE.

ORESTES SAMPSON, OF PETERSBURG, ILLINOIS.

IMPROVEMENT IN COMBINED GANG-PLOWS AND CULTIVATORS.

Specification forming part of Letters Patent No. 112,079, dated February 21, 1871; antedated February 20, 1871.

*To all whom it may concern:*

Be it known that I, ORESTES SAMPSON, of Petersburg, in the county of Menard and State of Illinois, have invented certain Improvements in Combined Gang-Plows and Cultivators, of which the following is a specification, reference being had to the accompanying drawings.

My invention relates to a combined gang-plow and cultivator; and it consists in a jointed wheeled frame of peculiar construction, provided with interchangeable plows and cultivator-shovels, as hereinafter described.

Figure 1 is a top plan view of my device arranged as a gang-plow; and Fig. 2 a longitudinal vertical section of the same, taken on the line $x^*x$ of Fig. 1. Fig. 3 is a top plan view of the forward and pivoted portion of the frame detached, and cultivator-shovels substituted for the plows shown therein in Fig. 1; and Fig. 4 is a side view of one of the detachable rock-shafts having the shovels attached.

My machine consists, mainly, of an axle, A, mounted in two driving-wheels, $a$, and having secured rigidly to it a rectangular frame, B, the side rails of which extend forward of the axle, and have pivoted to and between them a smaller rectangular frame, D, which is free to rock upon its pivots $c$, and to which the plows and shovels are attached, as hereinafter described.

On the frame B, in rear of the axle, is mounted a longitudinal seat, C, for the driver, this seat being so located and the frame B so balanced that when the driver sits upon the forward end of the seat, the frame will maintain a horizontal position, or thereabout, but that when he moves backward, his weight will depress the rear end of frame B, and thereby elevate its arms $b$ and raise the frame D, as shown in dotted lines in Fig. 2.

Upon the frame D is placed the tongue G of the machine, hinged or otherwise attached to the rear bar of said frame, and extending forward between two arms, $d$, on the front bar of the same, said arms being provided with a series of holes, and the tongue with a corresponding hole, so that by means of a pin inserted therein the forward end of the tongue may be adjusted in height, as required. The under side of the frame D, on each side of the tongue, is provided with a pair of boxes or bearings, $e$, by means of which two bars, E, each carrying a plow, H, may be secured to the frame, as in Figs. 1 and 2, the ends of the bars being provided with necks which enter the boxes, and which are flattened upon their upper sides, so that when secured in place the bars are held from turning, and thereby the plows maintained in position.

When thus arranged, the device forms a gang-plow, upon which the operator can ride and regulate the depth of the plows, or throw them out of the ground by merely moving forward or back upon his seat.

When the machine is to be used as a cultivator, the boxes $e$ are loosened, and the bars E, carrying the plows, removed, and rock-shafts F, having round journals, and each carrying two shovels, I, as shown in Fig. 4, are substituted therefor, as shown in Fig. 3. The forward shovels are set inward and the rear shovels outward, in the manner common in straddle-row cultivators, and each of the rock-shafts are provided with an operating-handle, J, as shown in Figs. 3 and 4, and the handles of the two shafts are connected by a rod or link, $m$, attached to eyes thereon, as shown in Fig. 3, so that by operating either handle both pairs of shovels may be thrown from side to side, as necessary, in addition to which they may also be raised and lowered in the same manner as the plows by the weight of the driver.

If desired, the boxes $e$ may be made adjustable laterally, to provide for setting the plows or shovels at different distances apart, as occasion may require.

By these means I provide a very simple and efficient implement adapted to all the ordinary uses of the plow, and also of a cultivator, and one that can be operated with much less labor than is generally required in gang-plows of the ordinary construction, and which costs to the farmer but little more than either one of the said implements as ordinarily made.

Having thus described my invention, what I claim is—

The combination of the main frame B, mounted on wheels $a$, and provided with the seat C, with the auxiliary frame D, having the adjustable tongue G attached, and adapted to carry either plows or cultivators, whereby the implement is fitted to be used either as a gang-plow or a cultivator, as set forth.

ORESTES SAMPSON.

Witnesses:
   W. IRA ALLEN,
   D. H. WILLIAMS.